(12) United States Patent
Harvey et al.

(10) Patent No.: US 10,727,724 B2
(45) Date of Patent: Jul. 28, 2020

(54) ELECTRIC MOTOR GENERATOR SYSTEM WITH A PLURALITY OF MAGNET PORTIONS ABUTTING AN INWARDLY FACING SURFACE OF A SHAFT

(71) Applicants: ROLLS-ROYCE plc, London (GB); Rolls-Royce Marine AS, Ulsteinvik (NO)

(72) Inventors: Giles E. Harvey, Derby (GB); Astrid Rokke, Trondheim (NO)

(73) Assignees: ROLLS-ROYCE plc, London (GB); ROLLS-ROYCE MARINE AS, Ulsteinvik (NO)

( * ) Notice: Subject to any disclaimer, the term of this patent is extended or adjusted under 35 U.S.C. 154(b) by 0 days.

(21) Appl. No.: 16/132,524

(22) Filed: Sep. 17, 2018

(65) Prior Publication Data
US 2019/0123626 A1 Apr. 25, 2019

(30) Foreign Application Priority Data
Oct. 20, 2017 (GB) .................................. 1717242.0

(51) Int. Cl.
*H02K 21/28* (2006.01)
*H02K 7/18* (2006.01)
(Continued)

(52) U.S. Cl.
CPC ............. *H02K 21/28* (2013.01); *F01D 15/10* (2013.01); *H02K 1/32* (2013.01); *H02K 7/003* (2013.01); *H02K 7/08* (2013.01); *H02K 7/088* (2013.01); *H02K 7/1823* (2013.01); *H02K 9/19* (2013.01); *H02K 16/005* (2013.01); *F05D 2220/32* (2013.01); *F05D 2260/00* (2013.01); *F05D 2260/20* (2013.01)

(58) Field of Classification Search
CPC ......... H02K 21/28; H02K 9/19; H02K 7/1823
See application file for complete search history.

(56) References Cited

U.S. PATENT DOCUMENTS

| 2002/0053838 | A1* | 5/2002 | Okuda | .................... F02N 11/04 310/59 |
| 2010/0253167 | A1* | 10/2010 | Charnley | ............. H02K 1/2786 310/83 |

(Continued)

FOREIGN PATENT DOCUMENTS

| GB | 2454285 | 5/2009 |
| WO | 2004022948 | 3/2004 |

OTHER PUBLICATIONS

Great Britain Search Report dated Apr. 12, 2018, issued in GB Patent Application No. 1717242.0.

*Primary Examiner* — Sean Gugger
(74) *Attorney, Agent, or Firm* — Oliff PLC

(57) ABSTRACT

An electric motor generator system has a hollow rotatable shaft, a coil spar, and a plurality of magnet portions. The hollow rotatable shaft has a central longitudinal axis. The coil spar comprises one or more coil assemblies and is positioned concentrically within the hollow rotatable shaft. Each of the magnet portions is shaped to conform to a radially inwardly facing surface of the shaft. Each of the plurality of magnet portions abuts conformally against the radially inwardly facing surface of the shaft between the radially inwardly facing surface and the or each coil assembly.

12 Claims, 3 Drawing Sheets

(51) Int. Cl.
    *H02K 1/32*     (2006.01)
    *H02K 16/00*     (2006.01)
    *H02K 7/08*     (2006.01)
    *F01D 15/10*     (2006.01)
    *H02K 7/00*     (2006.01)
    *H02K 9/19*     (2006.01)

(56) References Cited

U.S. PATENT DOCUMENTS

2010/0326050 A1* 12/2010 Schilling ................ F01D 15/10
                                                                                                       60/268
2014/0252900 A1* 9/2014 Mandes ................ H02K 21/36
                                                                                                       310/154.29

* cited by examiner

ELECTRIC MOTOR GENERATOR SYSTEM WITH A PLURALITY OF MAGNET PORTIONS ABUTTING AN INWARDLY FACING SURFACE OF A SHAFT

CROSS-REFERENCE TO RELATED APPLICATIONS

This application is based upon and claims the benefit of priority from British Patent Application No. GB 1717242.0 filed on 20 Oct. 2017, the entire contents of which are incorporated by reference.

BACKGROUND

Technical Field

The present disclosure relates to an electric motor generator system and particularly, but not exclusively, to an electric motor generator system for a gas turbine engine.

Description of the Related Art

Gas turbine engines, while providing mechanical power, have a requirement for electrical energy, for example to power ancillary equipment and control systems for the engine. In a conventional gas turbine engine, a gearbox and secondary drive system is used to power an electrical motor generator. Such an arrangement is complex, bulky, requires regular maintenance, and can make the gas turbine engine difficult to package, for example within a nacelle.

Other examples of rotating machinery such as stationary power generation, marine propeller drives, etc., often have a similar requirement for supplementary electrical power.

There is therefore a need for an electric motor generator system that addresses these deficiencies.

SUMMARY

According to a first aspect of the present disclosure there is provided an electric motor generator system comprising:
a hollow rotatable shaft, the hollow shaft having a central longitudinal axis;
a coil spar, the coil spar being positioned concentrically within the hollow rotatable shaft, the coil spar comprising one or more coil assemblies; and
a plurality of magnet portions, each magnet portion shaped to conform to a radially inwardly facing surface of the shaft;
wherein each of the plurality of magnet portions aligns conformally against the radially inwardly facing surface of the shaft between the radially inwardly facing surface and the or each coil assembly.

The electric motor generator system of the present disclosure inverts the standard arrangement of a permanent magnet electric motor generator system such that the stator, having one or more coil assemblies) is located in the centre and the magnet portions are mounted to a shaft positioned radially outside of the stator.

The magnet portions are positioned against a radially inwardly facing surface of the rotatable shaft. The attachment of the magnet portions to the rotatable shaft is simplified by using the centrifugal force generated by the shaft rotation to hold the magnet portions in place against the rotatable shaft.

This arrangement of magnet portions may eliminate the need for supplementary magnet retention bands or the use of other fastening systems, such as adhesives or other fasteners. This makes the electric motor generator system of the present disclosure simpler, lighter and easier to integrate into existing hardware, than prior art electric motor generator systems.

Attaching the magnet portions to the radially inwardly facing surface of the rotatable shaft allows higher rotational speeds than a conventional electrical machine arrangement in which they are radially inwardly of the coil assemblies. This in turn allows the electric motor generator system of the present disclosure to operate at higher rotational speeds and so provides for increased efficiency in comparison to prior art motor generator systems.

Optionally, the plurality of magnet portions extends around a complete circumference of the radially inwardly facing surface.

The magnet portions may extend in a circumferentially spaced arrangement around the radially inwardly facing surface of the rotatable shaft. In other words, there may be circumferential gaps between adjacent ones of the magnet portions in this alternative arrangement.

Optionally, the one or more coil assemblies are positioned on a radially outwardly facing surface of the coil spar.

Positioning the one or more coil assemblies on a radially outwardly facing surface of the coil spar improves the positional stability of the or each coil assembly when in operation.

Optionally, the shaft has a working length, the plurality of magnet portions extending along the entirety of the working length (L), the shaft has an outer diameter (D), and a ratio of L/D is greater than approximately 2.

The arrangement of a radially outer rotor enclosing a stator, with the magnet portions secured against a structurally rigid outer shaft, enables the clearance between the coil assemblies and the magnet portions to be reduced, which increases the electrical efficiency of the motor generator system.

Optionally, the coil spar is provided with a plurality of cooling holes, the plurality of cooling holes being arranged adjacent to the or each coil assembly.

By providing cooling to the or each coil assembly it is possible to reduce the operating temperature of the coil assemblies, which in turn enables the motor generator system to operate at higher power levels.

Optionally, a centre bore of the coil spar is provided with a cooling fluid, and the plurality of cooling holes directs the cooling fluid onto the or each coil assembly.

In one embodiment of the disclosure, a cooling fluid is directed onto the or each coil assembly through the plurality of cooling holes to reduce an operating temperature of the coil assemblies. This cooling fluid may be a fluid that is already being circulated within the shaft Optionally, a radially outwardly facing surface of the coil spar is crenelated, the crenelated surface comprising an axial sequence of crenels and merlons, and the or each coil assembly is positioned on a radially outwardly facing surface of a corresponding one of the merlons.

The crenels on the radially outwardly facing surface of the coil spar serve to separate the coil assemblies. The increased radius of each of the crenels improves the structural stiffness of the coil spar.

In one arrangement of the present disclosure, the crenels extend circumferentially around the radially outwardly facing surface of the coil spar. In an alternative arrangement, the crenels extend axially along an axial length of the crenels.

Optionally, the electric motor generator system further comprises at least three bearing assemblies spaced along the hollow shaft, and the or each bearing assembly provides for rotational support between a radially inwardly facing surface of the shaft and a radially outwardly facing surface of the coil spar.

Attaching the coil assemblies to the coil spar makes them less stiff than a conventional electrical machine arrangement in which they are radially outwardly of the rotor magnets. This arrangement can allow a flexibility that with suitably positioned bearings can be made to conform to any induced bending in the rotor.

Any shaft assembly having a high L/D ratio may be susceptible to deflection at high rotational speeds, for example in the form of 'hogging' of the shaft. Such deflection may be detrimental to the performance of an electrical machine comprising such a shaft by, for example removing the uniformity of a clearance between the shaft and another rotational component.

In the present case, the magnet portions rotate with the shaft around the coil assemblies that are attached to the coil spar. A predetermined radial clearance between the magnet portions and the coil assemblies is selected to optimise the electrical performance of the electric motor generator system.

If in use the shaft deflects as a result of forces generated by the rotational speed of the shaft then the predetermined clearance between the magnet portions and the coil assemblies will be lost. This will adversely affect the electrical performance of the electric motor generator system.

By providing one or more bearing assemblies that each provide rotational support between the shaft and the coil spar, any deflection along an axial length of the shaft can be conformally transferred to the coil spar. In other words the inclusion of bearing assemblies at each of the crenels ensures that the coil spar and the shaft deflect together in the same sense. This in turn enables the electric motor generator system of the present disclosure to maintain a constant pre-determined clearance between the coil spar and the magnet portions across an entire operating speed range of the system.

Optionally, a spacing between adjacent bearing assemblies is less than the outer diameter of the shaft.

During operation of the engine it is possible for the shaft to undergo flexure due to, for example, engine casing distortion. In order to maintain efficient operation of the electric motor generator system it is necessary to maintain the hollow shaft and the coil spar in concentric alignment.

Keeping the spacing between adjacent bearing assemblies smaller than the outer diameter of the shaft ensures that the hollow shaft and the coil spar remain concentrically aligned even during flexure of the shaft. This in turn means that the electrical field interactions between the magnet portions attached to the hollow shaft and the coil spar can be maintained and thus the electric motor generator system can be operated as designed.

Optionally, the bearing assemblies are equi-spaced along the shaft.

Maintaining approximately equal spacing between adjacent bearing assemblies further assists in ensuring that the axial alignment of the coil spar corresponds to the axial alignment of the hollow shaft.

Optionally, the coil spar is rotatable about the central longitudinal axis.

By enabling each of the shaft and the coil spar to rotate around the longitudinal axis, it is possible to arrange for a predetermined difference in rotational speed between the shaft and the coil spar across the operating range of the electric motor generator system.

Optionally, the shaft rotates in a first rotational direction, and the coil spar rotates in a second rotational direction, with the first rotational direction being opposite to the second rotational direction.

Contra-rotation of the shaft and the coil spar will increase the relative rotational speed between the shaft and the coil spar. This in turn can increase the electrical power generated by the system when it is in a generator configuration.

According to a second aspect of the present disclosure there is provided a gas turbine engine comprising an electric motor generator system according to the first aspect.

Other aspects of the disclosure provide devices, methods and systems which include and/or implement some or all of the actions described herein. The illustrative aspects of the disclosure are designed to solve one or more of the problems herein described and/or one or more other problems not discussed.

DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
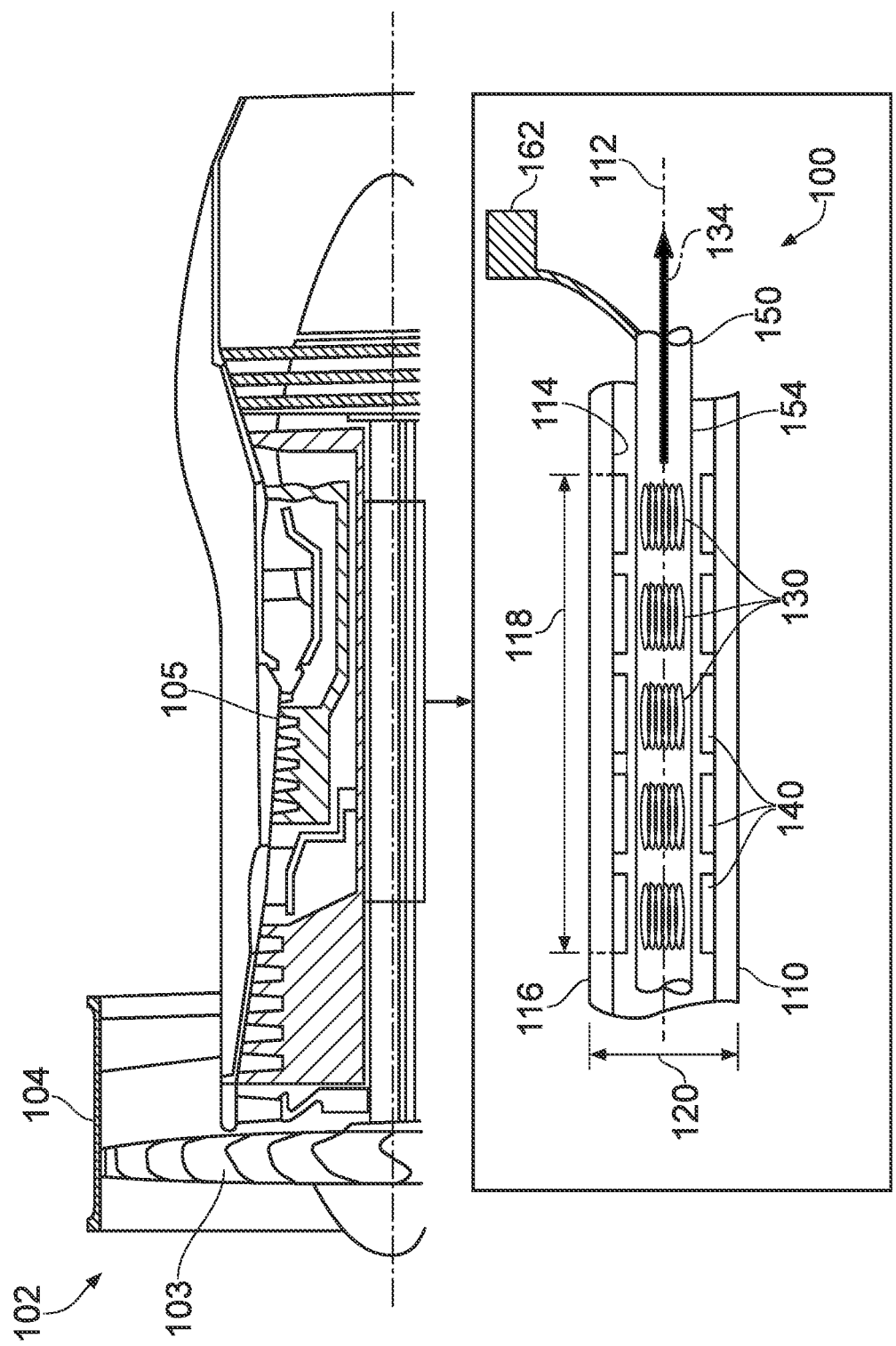
FIG. 1 shows a schematic part-sectional view of a turbofan gas turbine engine incorporating an electric motor generator system according to a first embodiment of the present disclosure.
Figure 2:
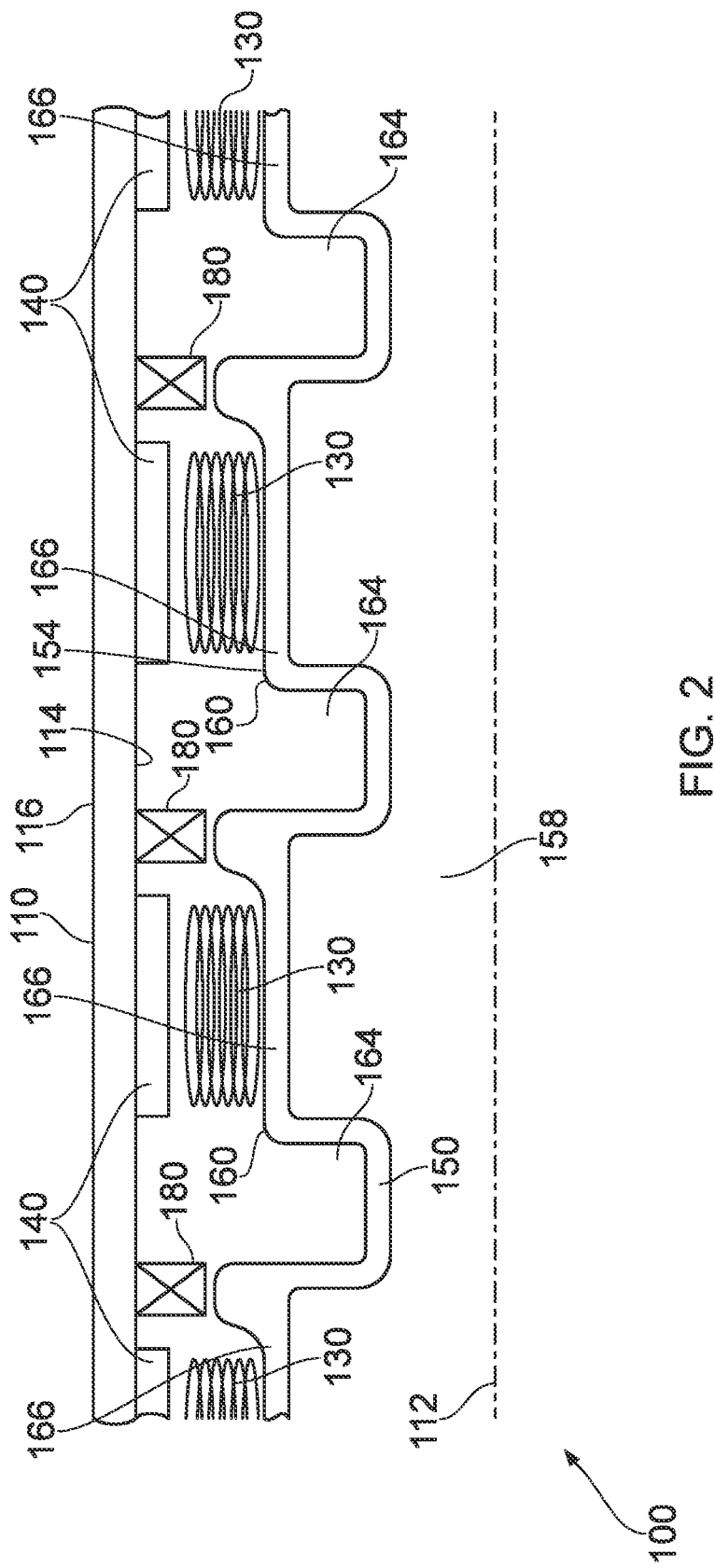
FIG. 2 shows a schematic part-sectional view of the electric motor generator system of FIG. 1.

Referring to FIGS. 1 and 2, an electric motor generator system according to a first embodiment of the disclosure is designated generally by the reference numeral 100.

In the context of the present disclosure, the electric motor generator system 100 is integrated into a turbofan gas turbine engine 102. The turbofan engine 102 comprises a fan assembly 103 and a core gas turbine engine 105, both positioned within a casing 104. The electric motor generator system 100 is positioned within the centre shaft of the core gas turbine engine 105.

Although in the following detailed description the electric motor generator system 100 is described with reference to a turbofan gas turbine engine, it is to be understood that the electric motor generator system 100 may form part of any suitable rotating machinery such as, for example, marine propulsion drives, industrial power transfer drives, and other motive power transfer arrangements.

The electric motor generator system 100 comprises a hollow rotatable shaft 110, a coil spar 150 comprising coil assemblies 130, and a plurality of magnet portions 140. The shaft 110 has a central longitudinal axis 112.

Each of the magnet portions 140 is shaped to conform to a radially inwardly facing surface 114 of the shaft 110. The magnet portions 140 abut against the radially inwardly facing surface 114 of the shaft 110. In the present embodiment, the magnet portions 140 extend around the complete circumference 116 of the radially inwardly surface 114 of the shaft 110. In this way, the magnet portions 140 line the radially inwardly facing surface 114 of the shaft 110.

In the present arrangement, the shaft 110 is formed from a ferritic steel and acts as a magnetic yoke thus increasing torque density. In an alternative arrangement the rotor poles can be formed as a Halbach array, which can reduce the magnetic fields in the yoke and thus increase the torque density of the motor generator system.

In the present arrangement, the magnet portions 140 are secured within the shaft by virtue of the geometrical placement of the magnet portions 140 around the circumference 116 of the radially inwardly surface 114 of the shaft 110. In operation, the centrifugal loading generated by the rotation of the shaft 110 provides an additional force securing the magnet portions 140 in place against the radially inwardly surface 114 of the shaft 110.

Each of the coil assemblies 130 is positioned in axial sequence along an axial length of the coil spar 150. The coil spar 150 is accommodated within the hollow shaft 110. The coil spar 150 is positioned concentrically with the shaft 110. The shaft 110 encloses the coil spar 150. The shaft 110 is rotatable relative to the stationary coil spar 150 by means of bearing assemblies 124. The coil spar 150 is provided with a torque reaction mount 162.

The coil spar 150 has a radially outwardly facing surface 154. The radially outwardly facing surface 154 is provided with crenellations 160. In the present arrangement the crenellations 160 extend in an axial direction such that each individual crenellation 160 extends circumferentially around the radially outwardly facing surface 154 of the coil spar 150.

The crenellations 160 comprise an axial sequence of crenels 164 and merlons 166. Each of the crenels 164 extends radially outwardly of each of the merlons 166.

Each coil assembly 130 is accommodated on a radially outwardly facing surface of a corresponding one of the merlons 166.

In the embodiment shown in FIGS. 1 and 2, a bearing assembly 180 is positioned at each of the merlons 166. Each of the bearing assemblies 180 provides rotational support between the radially inwardly facing surface 114 of the shaft 110, and the radially outwardly facing surface 154 of the coil spar 150.

The bearing assemblies 180 are spaced along the axial length of the shaft 110 at the spacing of the crenellations 160. In the present arrangement, each of the bearing assemblies 180 is spaced along the axial length of the hollow shaft 110 with approximately equal spacing between adjacent bearing assemblies 180.

The mechanical linkage between the shaft 110 and the coil spar 150, provided by the bearing assemblies 180 ensures that if the shaft 110 deforms due to bending loads then the coil spar 150 will adopt the same deformed shape. In other words if the shaft 110 exhibits 'hogging' due, for example, to centrifugal loading, then the coil spar 150 will adopt a correspondingly 'hogged' shape. This means that a clearance between the radially inwardly facing surface 114 of the shaft 110, and the coil spar 150 will remain constant irrespective of the geometrical shape adopted by the shaft 110.

The shaft 110 has a working length (L) 118 which is the axial length along the shaft 110 over which extends the opposing coil assemblies 130 and magnet portions 140. The shaft 110 has an outer diameter (D) 120. Consequently, the electric motor generator system has an L/D ratio that is greater than approximately 2.

In operation, the coil spar 150 is held in a stationary position via the torque reaction mount 162. The relative rotation between the shaft 110 and the coil spar 150 enable the motor generator system to generate electrical power. This electrical power is transmitted from the motor generator system 100 via the electrical power output 134.

Figure 3:
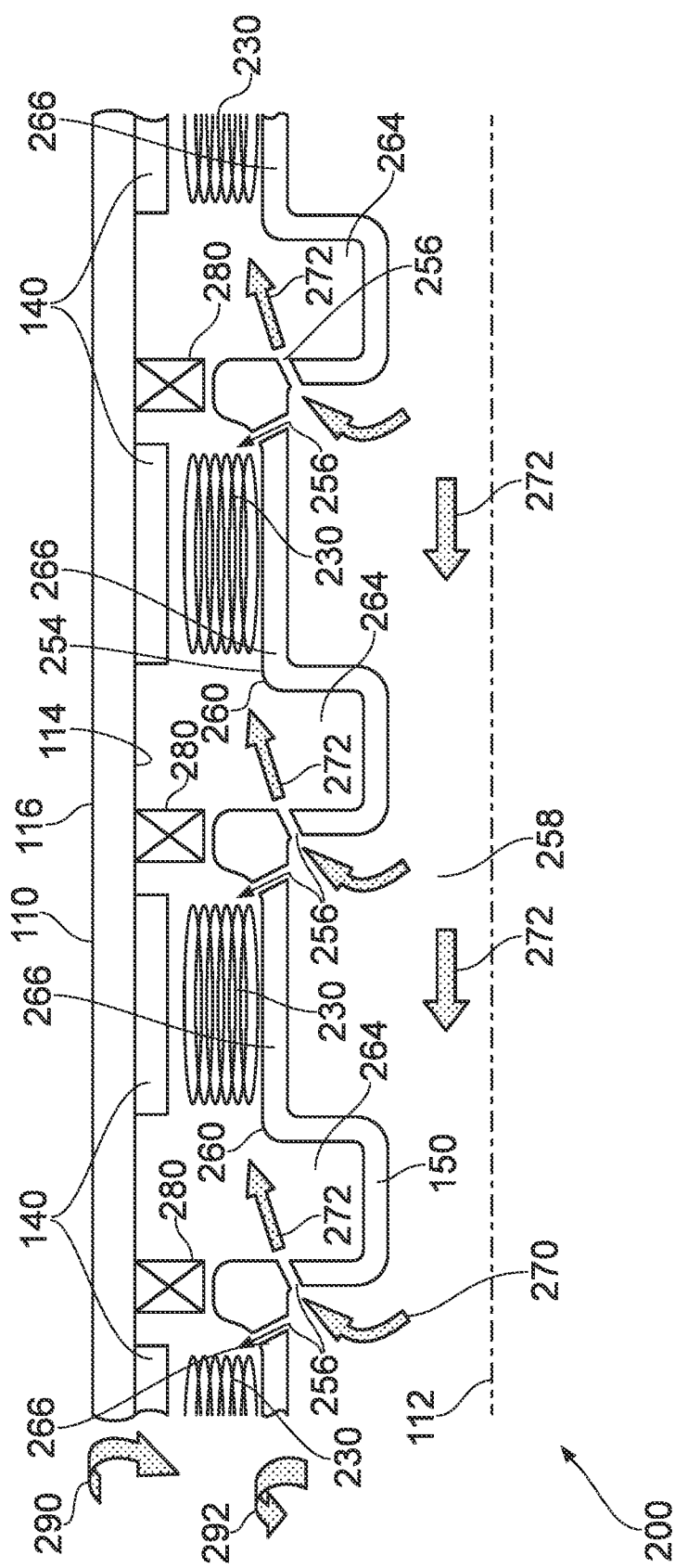
FIG. 3 shows a schematic part-sectional view of an electric motor generator system according to a second embodiment of the present disclosure.

Referring to FIG. 3, an electric motor generator system according to a second embodiment of the disclosure is designated generally by the reference numeral 200. Features of the electric motor generator system 200 which correspond to those of electric motor generator system 100 have been given corresponding reference numerals for ease of reference.

The electric motor generator system 200 has a shaft 110 enclosing a coil spar 250. The shaft 110 comprises a plurality of magnet portions 140 attached to a radially inwardly facing surface 114 of the shaft 110.

The coil spar 250 comprises a radially outwardly facing surface 254 having a crenellated profile in the axial direction. The crenellations 260 comprise an axial sequence of crenels 264 and merlons 266. Each of the crenels 264 extends radially outwardly of each of the merlons 266.

The coil spar 250 comprises coil assemblies 230, with each coil assembly 230 positioned on a radially outwardly facing surface of a respective one of the merlons 266.

The coil spar 250 is provided with a plurality of cooling holes 256. The cooling holes 256 are positioned adjacent to each coil assembly 230.

The coil spar 250 has a centre bore 258 through which passes a flow 272 of cooling fluid 270. The cooling fluid 270 flows axially along the centre bore 258 and then flows radially outwardly through the cooling holes 256 and thence onto each coil assembly 230.

As with the previous embodiment, a bearing assembly 280 is positioned at each of the merlons 266. Each of the bearing assemblies 280 provides rotational support between the radially inwardly facing surface 114 of the shaft 110, and the radially outwardly facing surface 254 of the coil spar 250.

The bearing assemblies 180 are spaced along the axial length of the shaft 110 at the spacing of the crenellations 260. In the same way as described above for the previous embodiment, the arrangement of bearing assemblies 280 ensures that any bending of the shaft 110 is conformally transferred the coil spar 250. This in turn maintains a radial clearance between the radially inwardly facing surface 114 of the shaft 110, and the coil spar 250 at a constant pre-determined value.

In the embodiment shown in FIG. 3, the shaft 110 rotates in a first direction 290, while the coil spar 250 rotates in a second direction 292, with the first direction 290 and the second direction 292 being opposite to one another. This increases the relative rotational speed between the shaft 110 and the coil spar 250, which in turn increases the electrical power output of the system 200 when in a generator configuration.

In the present arrangement, the cooling fluid 170 is the lubricant fluid that is used to provide lubrication and heat transfer within the gas turbine core engine.

In the present detailed description, the electric motor generator system 100 is described with reference to its application as an electric generator that is integrated into a turbofan gas turbine engine. However, the electric motor generator system 100 may equally function as an electric motor integrated in a gas turbine engine. Alternatively, the electric motor generator system 100 may be applied to other rotating systems as described above, either as an electric generator or as an electric generator.

Various example embodiments of the disclosure are described herein. Reference is made to these examples in a non-limiting sense. They are provided to illustrate more broadly applicable aspects of the disclosure. Various changes may be made to the disclosure described and equivalents may be substituted without departing from the scope of the disclosure. In addition, many modifications may be made to adapt a particular situation, material, composition of matter, process, process act(s) or step(s) to the objective(s), spirit or scope of the present disclosure. Further, it will be appreciated by those with skill in the art that each of the individual variations described and illustrated herein has discrete components and features which may be readily separated from or combined with the features of any of the other several embodiments without departing from the scope of the present disclosure. All such modifications are intended to be within the scope of claims associated with this disclosure.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. An electric motor generator system comprising:
   a hollow rotatable shaft having a central longitudinal axis;
   a coil spar positioned concentrically within the hollow rotatable shaft and comprising one or more coil assemblies; and
   a plurality of magnet portions each shaped to conform to a radially inwardly facing surface of the shaft;
   wherein each of the plurality of magnet portions abuts conformally against the radially inwardly facing surface of the shaft between the radially inwardly facing surface and the or each coil assembly; and
   wherein the plurality of magnet portions extends continuously around a complete circumference of the radially inwardly facing surface of the shaft.

2. The electric motor generator system as claimed in claim 1, wherein the one or more coil assemblies are positioned on a radially outwardly facing surface of the coil spar.

3. The electric motor generator system as claimed in claim 1, wherein
   the shaft has a working length (L), the plurality of magnet portions extending along the entirety of the working length (L);
   the shaft has an outer diameter (D); and
   a ratio of L/D is greater than approximately 2.

4. The electric motor generator system as claimed in claim 1, wherein the coil spar is provided with a plurality of cooling holes that are adjacent to the or each coil assembly.

5. The electric motor generator system as claimed in claim 4, wherein a centre bore of the coil spar is provided with a cooling fluid, and the plurality of cooling holes directs the cooling fluid onto the or each coil assembly.

6. The electric motor generator system as claimed in claim 1, wherein a radially outwardly facing surface of the coil spar is crenelated, the crenellated surface comprises an axial sequence of crenels and merlons, and the or each coil assembly is positioned on a radially outwardly facing surface of a corresponding one of the merlons.

7. The electric motor generator system as claimed in claim 6, further comprising at least three bearing assemblies spaced along the hollow shaft, and wherein each bearing assembly provides for rotational support between the radially inwardly facing surface of the shaft and the radially outwardly facing surface of the coil spar.

8. The electric motor generator system as claimed in claim 7, wherein a spacing between adjacent bearing assemblies is less than an outer diameter of the shaft.

9. The electric motor generator system as claimed in claim 7, wherein the bearing assemblies are equi-spaced along the shaft.

10. The electric motor generator system as claimed in claim 1, wherein the coil spar is rotatable about the central longitudinal axis.

11. The electric motor generator system as claimed in claim 10, wherein the shaft rotates in a first rotational direction, and the coil spar rotates in a second rotational direction opposite to the first rotational direction.

12. A gas turbine engine comprising an electric motor generator system as claimed in claim 1.

* * * * *